No. 744,128. Patented November 17, 1903.

UNITED STATES PATENT OFFICE.

EMERSON H. STRICKLER, OF BALTIMORE, MARYLAND.

PROCESS OF MANUFACTURING TRISODIUM PHOSPHATE.

SPECIFICATION forming part of Letters Patent No. 744,128, dated November 17, 1903.

Application filed January 21, 1903. Serial No. 139,977. (No specimens.)

*To all whom it may concern:*

Be it known that I, EMERSON H. STRICKLER, a citizen of the United States of America, residing at Baltimore, in the State of Maryland, have invented a certain new and useful Process for the Manufacture of Trisodium Phosphate, of which the following is a specification.

The invention herein set forth provides a new process for the manufacture of trisodium phosphate (commonly called "tribasic phosphate of soda") which has certain features of novelty and advantage.

At the present time trisodium phosphate is made from calcium phosphate in the following manner: The calcium phosphate is digested in an equivalent quantity of sulfuric acid, producing crude phosphoric acid. To this sodium carbonate is added to alkaline reaction, the disodium salt being formed. Finally, a slight excess of caustic soda over that required to form the trisodium salt is added and the solution is allowed to crystallize. It is to be noted that in this process three of the crude materials used are manufactured products—viz., sulfuric acid, sodium carbonate, and caustic soda. In my process I substitute for these three manufactured products a single material, niter cake, which has commonly been considered a waste product from the manufacture of sulfuric and nitric acids. With this niter cake I use calcium phosphate and a carbonaceous material, such as coal.

In general terms my process consists in digesting the calcium phosphate in the form of a phosphate rock in a water solution of the niter cake until the reaction is complete. To the liquor obtained by this reaction the carbonaceous material is added and the materials are furnaced, producing the trisodium phosphate.

In detail my process is as follows: Calcium phosphate, preferably in the form of a high-grade phosphate rock, is digested in a water solution of the niter cake in proper proportions until the reaction between the acid radical of the niter cake and the calcium phosphate is complete. This reaction may be expressed thus—

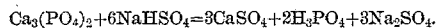
$$Ca_3(PO_4)_2 + 6NaHSO_4 = 3CaSO_4 + 2H_3PO_4 + 3Na_2SO_4.$$

This solution consists of phosphoric acid (obtained as a result of the decomposition of the calcium phosphate by the sulfuric acid of the niter cake) and sulfate of soda, (originally contained in the niter cake.) Calcium sulfate is obtained as an insolvent residue. The liquor is filtered from this residue and the carbonaceous material, such as coal, is added and the mixture concentrated to a pasty consistency. This mixture, consisting of sodium sulfate, phosphoric acid, and carbonaceous material, is then furnaced in a reverberatory or other convenient form of furnace until it ceases to give or gives only a slight test for sulfate. This furnace product is dissolved in hot water and purified by crystallization. The reactions in the furnace are somewhat complicated; but the total one consists in the formation of trisodium phosphate with a small amount of sodium sulfid, sodium carbonate, &c. The indications are that simultaneously sodium sulfate is reduced to sodium sulfid and the orthophosphoric acid to some degree changed into the pyro and meta forms. The phosphoric acid whatever its form at the time of the formation of the sulfid is neutralized by it, forming the sodium salts of phosphoric acid or its hydrates. As a result of the operation taking place in the presence of burning carbonaceous matter the sodium sulfid left over after the neutralization is largely converted to sodium carbonate. The mixed sodium phosphates fuse with this sodium carbonate and are thus converted to trisodium phosphate. The final result of the furnace reaction is as described.

The proportions used depend to some extent on the quality of the calcium phosphate, niter cake, and coal and must be arrived at empirically in each case to get the best results. I give as an example the following: working with a high grade of Tennessee phosphate rock and a fair grade of niter cake and coal six parts niter cake, three parts phosphate rock, and two parts coal.

The trisodium phosphate being produced according to the above process, di and mono sodium phosphates can readily be produced by the addition of crude phosphoric acid.

What I claim as new, and desire to secure by Letters Patent, is—

1. The treatment of calcium phosphate with a solution of niter cake and furnacing the solution thus obtained in the presence of a carbonaceous material.

2. The treatment of calcium phosphate with a solution of niter cake, concentrating the solution thus obtained, furnacing it in the presence of a carbonaceous material, and dissolving the furnaced product in water and allowing it to crystallize.

In testimony whereof I affix my signature in presence of two witnesses.

EMERSON H. STRICKLER.

Witnesses:
W. D. GILMAN,
C. A. JEFFERY.